A. G. GRICE.
FRICTION DRIVING GEAR FOR MOTOR CARS.
APPLICATION FILED JAN. 27, 1920.

1,409,946.

Patented Mar. 21, 1922.
2 SHEETS—SHEET 1.

INVENTOR
A. G. Grice,
BY H. R. Kerslake
ATTORNEY

UNITED STATES PATENT OFFICE.

ARTHUR GEORGE GRICE, OF MAIDENHEAD, ENGLAND.

FRICTION DRIVING GEAR FOR MOTOR CARS.

1,409,946.  Specification of Letters Patent.  Patented Mar. 21, 1922.

Application filed January 27, 1920. Serial No. 354,488.

*To all whom it may concern:*

Be it known that I, ARTHUR GEORGE GRICE, a subject of the King of Great Britain and Ireland, and residing at Cordwalles Works, Maidenhead, in the county of Berks, England, have invented certain new and useful Improvement in and Relating to Friction Driving Gears for Motor Cars, of which the following is a specification.

This invention relates to variable speed driving gear for motor cars of the well known "disc and wheel" type and its object is to provide simplified means for transmitting the movement from the engine shaft to the road wheels of the vehicle.

I use a sub-frame attached rigidly to the back axle casing on which the driving axle and road wheels are mounted, and which is jointed to the chassis frame by a universal joint, permitting the sub-frame and back axle to oscillate together relative to the chassis under the influence of the springs, this sub-frame acting as a torque rod.

The invention consists in mounting the variable speed friction driving gear on a sub-frame, in combination with transmitting the motion of the driven shaft of the friction gear to the driving axle (with or without differential gear) by a chain or other like gearing mounted in fixed relationship to the sub-frame between the brake drums on the driving axle. Such drive is situated on the axle between brake drums preferably as near the centre of the car as possible.

I append drawings illustrating the present invention as carried out in one form.

Figure 1:
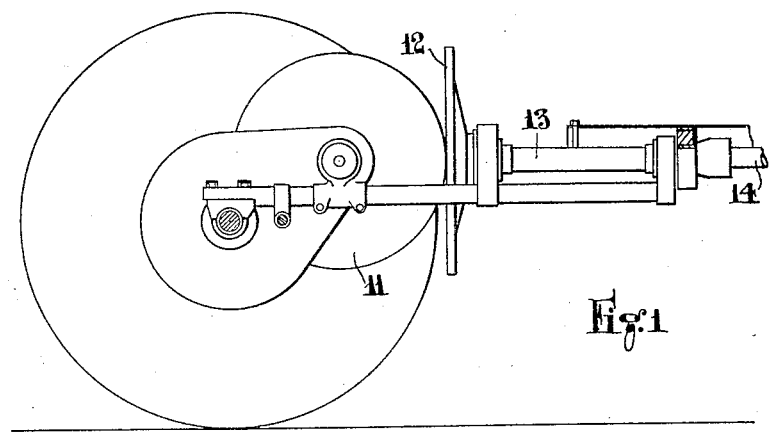
Figure 1 is a side elevation.
Figure 3:
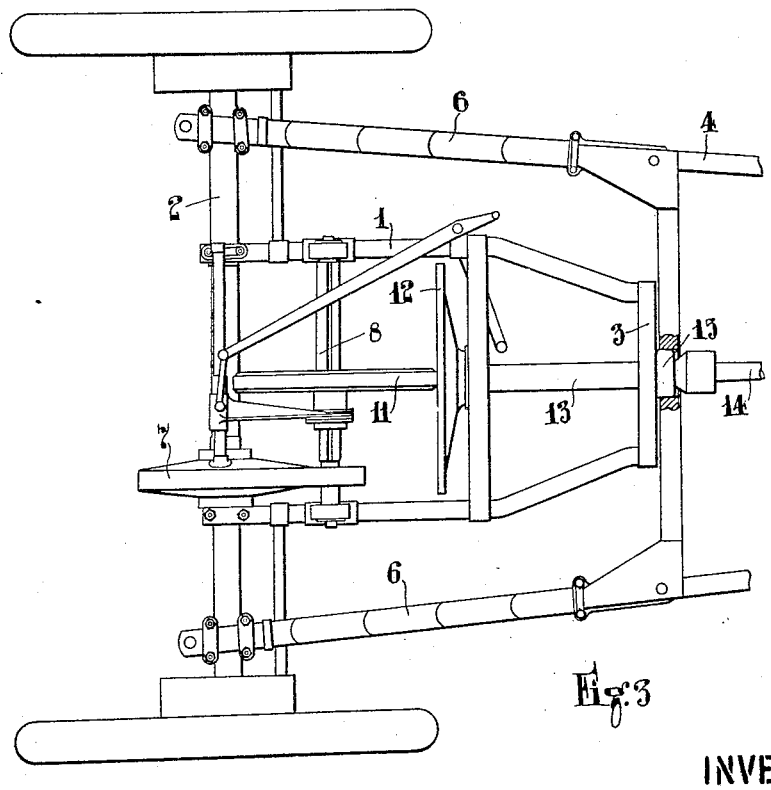
Figure 2:
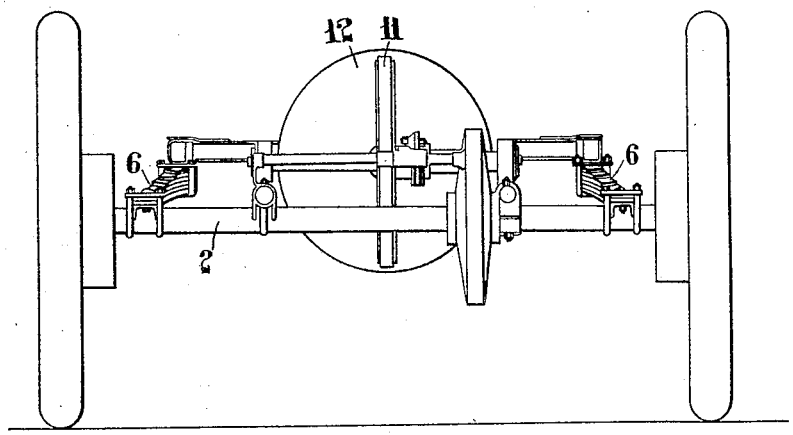
Figure 2 is a plan.

Figure 3 an end view.

The sub-frame 1 is made approximately triangular in plan, the base of the triangle being formed by the back axle casing 2, and the apex 3 being jointed by well known means to the chassis 4 in such manner as to permit the back axle 5 to rise and fall and to rock transversely relatively to the chassis 4 under the action of the springs 6.

The back axle assemblage may comprise differential gear and attachments for the springs 6 in the well known manner. A shaft 8 is mounted on the sub-frame 1 parallel to the back axle 5, and fixed thereto is a chain wheel or a spur wheel from which motion is communicated to a similar gear wheel on the driving axle or differential, such transmission gearing being enclosed inside a gear-case 7 and mounted in fixed relationship to the sub-frame 1. The shaft 8 is adapted to receive the driven wheel 11 of the friction gear in such manner that the wheel and shaft rotate together but the wheel can be displaced axially, in the usual manner with this type of gear. The driving friction disc 12 is fixed to the rear end of the propeller shaft which is suitably mounted on bearings carried on the sub-frame 1, and enclosed inside a tubular casing 13, the forward end of the said shaft being jointed to the engine shaft 14 by a universal coupling as nearly as possible concentric with the joint 15 of the sub-frame 1 to the chassis 4.

The friction driving disc 12 is pressed by a spring device against the driven wheel 11, in a manner well known, with such force as to ensure driving contact without slipping.

Having now described my invention what I claim as new and desire to secure by Letters Patent is:—

1. In a motor vehicle, a main frame, a sub-frame, a universal joint connecting the main frame with the sub-frame, a wheel driving axle mounted on the sub-frame, springs between the main frame and driving axle, a counter shaft, a variable speed friction driving gear wholly supported in the sub-frame and including a countershaft, and a single reduction gear between the counter shaft and the driving axle.

2. In a motor vehicle, a main frame, a sub-frame, a universal joint connecting the main frame with the sub-frame, a wheel driving axle mounted on the sub-frame, springs interposed between the main frame and the driving axle, a sectional propeller shaft partially supported in the main and sub-frames, a universal joint connecting the sections of the propeller shaft together and arranged in proximity to the first mentioned universal joint connecting the main and sub-frames, a counter shaft, a variable speed friction driving gear wholly supported in the sub-frame and connecting the propeller shaft with the counter-shaft, and a single reduction gear between the counter shaft and the driving axle.

In testimony whereof I have signed my name to this specification.

ARTHUR GEORGE GRICE.